(12) United States Patent
Bohner et al.

(10) Patent No.: US 7,954,875 B2
(45) Date of Patent: Jun. 7, 2011

(54) SUN VISOR FOR A MOTOR VEHICLE

(75) Inventors: Jan Bohner, Ingolstadt (DE);
Hans-Juergen Franz, Ingolstadt (DE);
Klaus Pflaumbaum, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 11/921,160

(22) PCT Filed: May 10, 2006

(86) PCT No.: PCT/EP2006/004367
§ 371 (c)(1),
(2), (4) Date: Nov. 28, 2007

(87) PCT Pub. No.: WO2006/128558
PCT Pub. Date: Dec. 7, 2006

(65) Prior Publication Data
US 2009/0152892 A1    Jun. 18, 2009

(30) Foreign Application Priority Data

Jun. 2, 2005   (DE) .......................... 10 2005 025 262

(51) Int. Cl.
*B60J 3/02* (2006.01)
(52) U.S. Cl. .................................... 296/97.13; 296/97.9
(58) Field of Classification Search ................. 296/97.4, 296/97.9, 97.12, 97.13
See application file for complete search history.

(56) References Cited

U.S. PATENT DOCUMENTS

| | | | | |
|---|---|---|---|---|
| 1,981,702 A | * | 11/1934 | Jacobs | 296/97.13 |
| 4,765,675 A | * | 8/1988 | Svensson | 296/97.4 |
| 5,261,717 A | * | 11/1993 | Tsumura et al. | 296/97.2 |
| 5,280,988 A | * | 1/1994 | Gute | 296/97.9 |
| 5,902,002 A | | 5/1999 | Wilson | |
| 6,131,986 A | | 10/2000 | Rosen | |

FOREIGN PATENT DOCUMENTS

| | | |
|---|---|---|
| DE | 510018 | 12/1928 |
| DE | 3442321 | * 5/1986 |
| DE | 3 710 429 | 10/1988 |
| DE | 38 29 976 | 3/1990 |
| FR | 0979311 | * 4/1951 |
| FR | 1 603 032 | 3/1971 |
| GB | 402700 | 12/1933 |
| IT | 0716239 | * 10/1966 |

* cited by examiner

*Primary Examiner* — Dennis H Pedder
(74) *Attorney, Agent, or Firm* — Novak Druce + Quigg LLP

(57) ABSTRACT

The present invention relates to a sun visor for a motor vehicle, with a planar, elongate main visor body which is mounted rotatably on a rotary spindle running approximately perpendicularly to the longitudinal extent of the main visor body, the rotary spindle being coupled to a main swivel spindle for swiveling the main visor body from a not-in-use position into a use position and vice versa, the main swivel spindle, in the not-in-use position, being integrated in the roof (6) of the motor vehicle parallel to the longitudinal extent of the main visor body and at a distance from the same.

7 Claims, 3 Drawing Sheets

SUN VISOR FOR A MOTOR VEHICLE

CROSS-REFERENCE TO RELATED APPLICATIONS

This application claims priority from German Application No. 102005025262.1 filed Jun. 2, 2005, hereby incorporated by reference in its entirety.

This invention relates to sun visor for a motor vehicle, in particular to a sun visor which can be attached in the roof area of the vehicle.

BACKGROUND OF THE INVENTION

Sun visors are common which can be pivoted down from the headliner, whereupon afterwards they can be rotated around a fulcrum in the upper area of the A pillar toward the door side window.

Sun visors such as these, however, have turned out to be unsatisfactory in several respects. When turned toward the side window, often the narrow side of the sun visor hits the head of the vehicle occupant who is pivoting the visor to the side. The vehicle occupant must then execute an inconvenient avoidance movement with his head; this moreover diminishes his attention span.

In the known visor according to document FR-B 16 03 032, a sun visor which can be equipped with various films can be moved along a holding rod and can be clamped with a threaded locking ring in the desired position. The holding rod for its part can in turn be moved relative to an angled articulated rod and can be locked with another threaded ring which is articulated on a base plate which is to be attached stationary.

In this approach according to the prior art, however, it has proven to be disadvantageous that handling of such a sun visor due to the many locking rings is very awkward and therefore little suited for a motor vehicle. Twisting of the visor body around an axis perpendicular to the holding rod is moreover not possible in this instance. If such a sun visor were mounted in a motor vehicle, upon pivoting from the windshield to a side window, the aforementioned problems would arise in this instance as well.

SUMMARY OF THE INVENTION

Patent DE 37 10 429 C2 describes a sun visor which is coupled to a holding rod. The body of the sun visor can be rotated relative to the holding rod around a pivot axis which runs in the longitudinal direction of the holding rod; this is achieved by the holding rod consisting of two parts which can be telescopically pushed into one another and which can likewise be twisted relative to one another in their common longitudinal axis. The outer component piece of the holding rod has one end which is bent at a right angle and which forms a pivot pin for the visor body. The visor body is pivotable in this way around the axis of rotation if the sun visor has been pivoted down into its use position. The holding rod is provided freely in the passenger compartment in the area of the headliner and is supported by way of a body-mounted articulation near the side window.

In this approach according to the prior art, however, it has proven to be disadvantageous that when the sun visor has been folded into the use position, the holding rod is exposed within the passenger compartment so that in the case of an accident a vehicle occupant for example can hit his head against the holding rod and can suffer injury. Moreover the pivot axis which is formed by the holding rod is located near the vehicle occupant so that the vehicle occupant may also possibly have to execute an avoidance motion with his head when the sun visor is pivoted and thus he is distracted from the traffic.

Thus the object of the invention is to eliminate the aforementioned disadvantages and especially to develop a sun visor for a motor vehicle which for the most part eliminates the risk of injury and ensures a continuous adjustment motion of the sun visor without the avoidance maneuver by the occupants.

The concept underlying this invention is for the sun visor to have a flat, elongated main visor body which is pivot-mounted on an axis of rotation which runs roughly perpendicular to the longitudinal extension of the main visor body, the axis of rotation being coupled to the main folding axis for folding the main visor body out of the non-use position into the use position and vice versa, which in the non-use position is integrated parallel to the longitudinal extension of the main visor body and spaced a distance from it in the roof of the motor vehicle.

Thus this invention relative to the known approaches of the prior art has the advantage that the main folding axis for folding the main visor body out of the non-use position into the use position is not located in the sun visor, but that the folding axis can be supported externally in the roof area of the motor vehicle. Thus the folding axis can be located for example in the area in front of the roof frame, i.e., in the area provided near the windshield far from the occupants, so that the folding motion of the visor body does not result in avoidance movements of the occupants.

Furthermore, due to the external support of the main folding axis, the visor body can be made thinner so that the installation space required is advantageously reduced.

Another advantage consists in that the folding axis, as a result of the integration into the roof area, for example in the front structure element in front of the roof frame, is supported protected such that the occupant in the event of an accident cannot hit his head against the folding axis. This reduces the danger of occupant injury.

As a result of the external support of the main folding axis, a double visor system can be implemented; it will be detailed below.

The dependent claims contain advantageous configurations and improvements of the sun visor specified in claim 1.

According to one preferred development, the main folding axis in the direction of the front side of the vehicle in front of the headliner is integrated in the roof frame or the assigned roof structure element in the transverse direction of the motor vehicle. In this way the main folding axis is positioned as far as possible from the vehicle occupants so that the folding motion can be easily implemented without an avoidance movement of the occupants.

Preferably the main folding axis is pivot-mounted in a main bearing which is integrated in the roof frame, and the main bearing can have, for example, a spring means which is used for pretensioning of the main folding axis in a predetermined direction of rotation. Thus, starting, for example, with a predetermined angle, the sun visor or visor body automatically returns to the non-use position and is stored firmly by pretensioning in this non-use position.

According to another preferred embodiment, the axis of rotation in the main visor body is pivot-mounted transversely to the longitudinal extension thereof in a lateral section. By preference, that section of the main visor body is selected which is located adjacent to the assigned side window. In the event of lateral light exposure, the visor body thus can be easily and reliably rotated in the direction of the side window.

According to another preferred development, the axis of rotation has a bent end which is coupled to the main folding axis. For example, the axis of rotation is connected integrally to the main folding axis by way of the bent end or is coupled by means of a suitable pivot connection to it with a swiveling capacity. This constitutes a simple and economical production effort.

Preferably, in the area of the roof frame in which the axis of rotation ends, a visor means is attached which encompasses at least one recess to enable a folding motion of the axis of rotation. The visor means is used for an aesthetic covering to ensure a visually pleasant overall impression viewed from the passenger compartment and for stable guidance of the axis of rotation along the recess for a folding motion of the sun visor.

In addition the axis of rotation for example has a hinge, preferably in the area between the main visor body and the bent end, i.e., the folding axis. This hinge is used for lateral tilting motion of the main visor body in the direction of the assigned side window of the motor vehicle. Thus, the sun visor can be rotated not only in the direction of the side window, but can also be bent or tilted by a certain angle into a suitable use position.

According to another preferred embodiment, the main visor body opposite the axis of rotation has a catch means, for example in the form of a catch rod which can be clipped into an assigned catch receiver and unclipped from it. The catch receiver is in turn preferably coupled to the main folding axis so that the main visor body can be folded around the main folding axis when locked by two connecting sites.

According to another preferred development, another flat, elongated visor body is provided as an auxiliary visor body. The auxiliary visor body in the non-use position is preferably located between the main visor body and the assigned roof frame section. The auxiliary visor body is advantageously pivot-mounted around the main folding axis out of the non-use position into the use position and vice versa by way of assigned clip arms likewise on the main folding axis for folding the auxiliary visor body. Thus, for oblique incident solar radiation, for example, the main visor body after folding down can be rotated and tilted in the direction of the side window, and the auxiliary visor body with respect to the windshield can be pivoted by a predetermined angle around the main folding axis. In this way, for oblique incident solar radiation and/or when cornering, for example, over a longer time interval, covering of the relevant window area can be ensured.

By preference, the clip arms of the auxiliary visor body are pivotally pretensioned by a further spring means for pretensioning of the folding process analogously to the main visor body in a predetermined direction of rotation on the main folding axis. In this way, for example, starting from a predetermined angle, the auxiliary visor body returns automatically to the non-use position for support.

BRIEF DESCRIPTION OF THE DRAWINGS

The invention will be detailed below using embodiments with reference to the attached figures of the drawings.

In the figures, the same reference symbols refer to the same or functionally identical components, unless indicated otherwise.

A first preferred embodiment of a sun visor is detailed below using FIGS. 1 and 2. FIG. 1 illustrates a cross sectional view of a sun visor in the non-use position and the use position, and FIG. 2 illustrates a perspective cut of the sun visor from FIG. 1, viewed in the direction of the rear of the vehicle in the non-use position.

Figure 1:
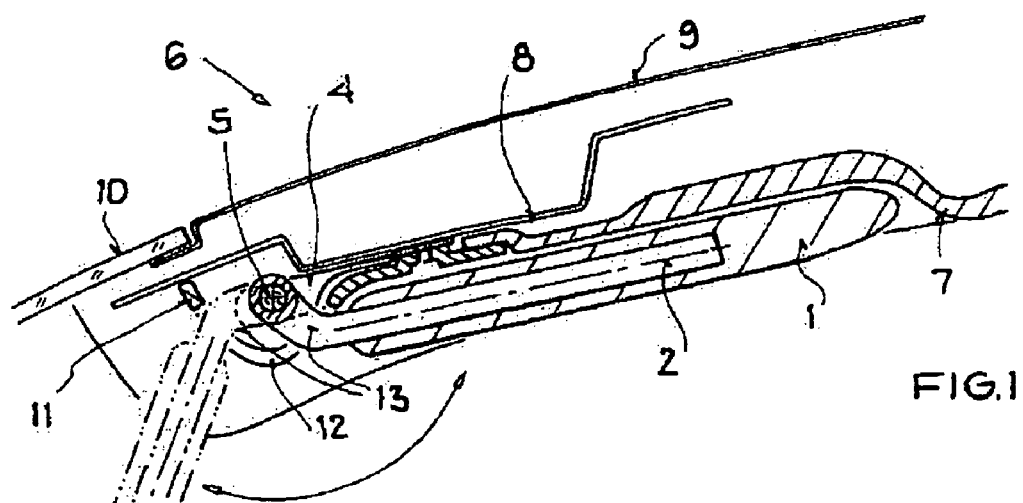
FIG. 1 shows a cross sectional view of a sun visor according to one preferred embodiment of this invention in the non-use position and a folded down use position.
Figure 2:
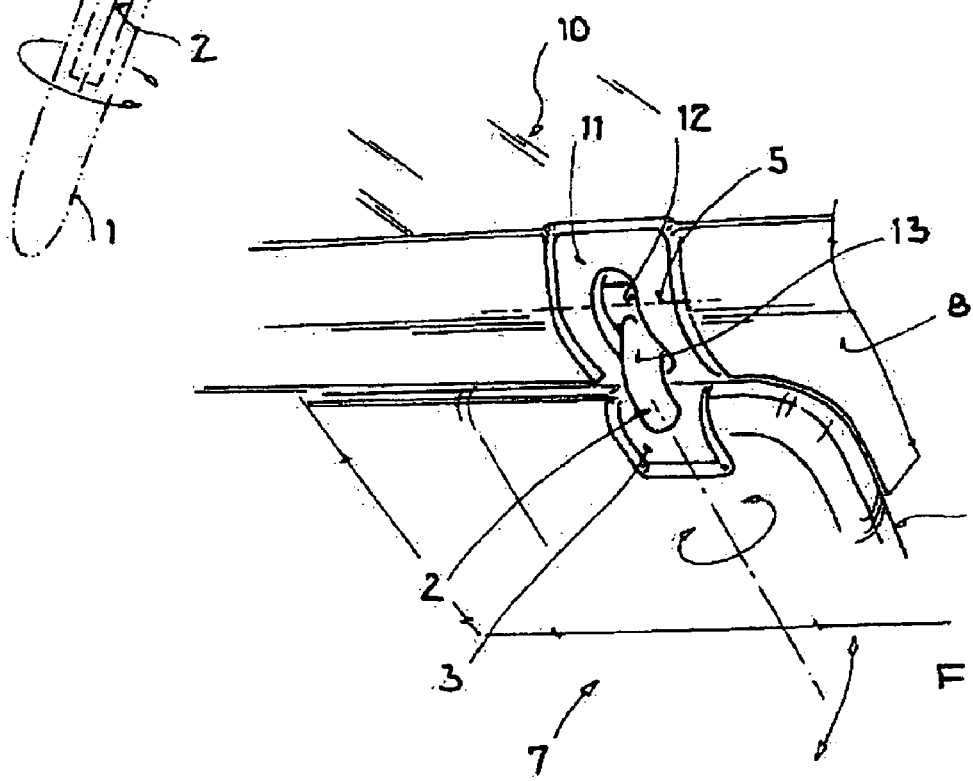
FIG. 2 shows a perspective view of a partial extract of the sun visor according to the preferred embodiment from FIG. 1 viewed in the direction of the rear of the vehicle.

As is to be seen in FIGS. 1 and 2, the sun visor according to this embodiment consists of a main visor body 1 which is formed preferably as a flat, elongated body, and from an opaque material.

The axis of rotation 2 is pivotally integrated into the main visor body 1 preferably in the direction transverse to the longitudinal extension of the main visor body 1, such that the main visor body 1 can be rotated or pivoted around the axis of rotation 2. Thus, the main visor body 1 can be rotated into the use position in the direction of an assigned window in order to shield the incident light radiation.

For example, the main visor body 1 in the side area which corresponds to the area of the visor body which is adjacent to the assigned window has a reinforcing area 3 for holding the axis of rotation 2, as is shown in FIG. 2.

DETAILED DESCRIPTION OF THE PREFERRED EMBODIMENTS OF THE INVENTION

As illustrated in particular in FIG. 1, the sun visor has another pivot axis in the form of a folding axis 5 which is preferably integrated in the area of the vehicle roof 6 in the transverse direction of the motor vehicle which is located in front of the headliner 7 viewed toward the front side of the vehicle and is thus far from the occupants. For example, the folding axis 5 is fastened via a bearing 6 to a structure element 8 of the roof body 9. The fastener can be for example a screw connection, a weld or the like. Thus the folding axis 5 in the transverse direction of the vehicle is preferably located between the headliner 7 and the vehicle windshield 10 and, as indicated above, in the roof area which is provided far from the vehicle occupants, so that in a folding motion of the main visor body 1 around the folding axis 5 an evasion maneuver of the vehicle occupants is advantageously unnecessary.

As is moreover to be seen in FIGS. 1 and 2, the sun visor according to this embodiment has a visor means 11 which is used mainly for covering the bearing 4 for aesthetic reasons. The visor means 11 in this embodiment is provided with at least one recess 12, in this embodiment with two recesses in order to ensure free pivoting motion of the axis of rotation 2 around the folding axis 5.

The axis of rotation 2 has an angled section 13 which projects from the main visor body 1 and which is preferably made in one piece with the main folding axis 5. But it is also conceivable that the bent section 13 as the bent end 13 of the axis of rotation 2 is coupled via a pivoting connection to the main folding axis 5 to be able to pivot around it.

The main folding axis 5, as is shown in particular in FIGS. 1 and 2, is preferably completely integrated in the roof element in the transverse direction of the vehicle, the main folding axis 5 preferably being located in the direction parallel to the longitudinal extension of the main visor body 1 and spaced a distance from it in the roof element.

Figure 3:
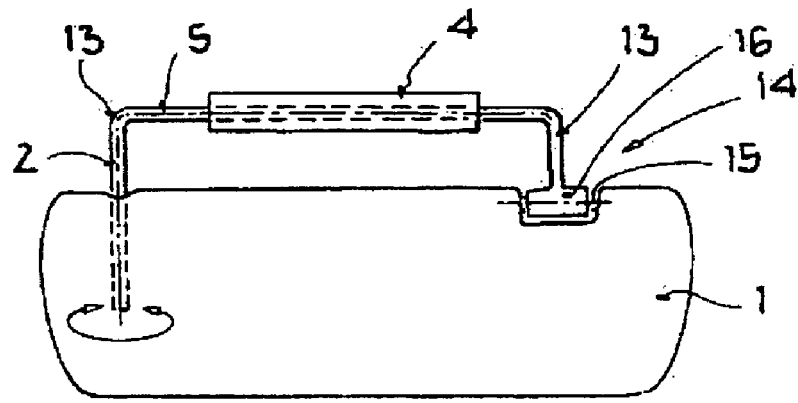
FIG. 3 shows a single sun visor according to one preferred embodiment of this invention.

The structure shown in FIG. 2 as a partial extract, consisting of a visor means 11 together with the recess 12 and the bent end 13 of the axis of rotation I is preferably provided a second time offset in the direction the vehicle center, as shown schematically in FIG. 3. In contrast to the structure shown in FIGS. 1 and 2, the axis of rotation 2 in this connection is not integrated as an axis of rotation into the main visor body 1, but is replaced by a clip arm with an assigned catch connection 14, as is to be seen in FIG. 3. The catch connection 14 consists, for example, of a visor body-side catch rod 15 and a conformally assigned clip arm-side catch receiver 16, so that the catch rod 15 can be clipped into the catch receiver 16 and can be unclipped from it under the action of a predetermined force. The catch connection 14 ensures unilateral support of the main visor body 1 on the axis of rotation when the catch rod 15 is unclipped from the catch receiver 16 and thus unilateral rotation of the main visor body 1 around the axis of rotation 2, for example in the direction of the assigned side window.

The main folding axis 5, as already explained above, is pivot-mounted in a bearing 4 which is integrated in the roof element. For example, the main folding axis 5 is coupled via one or more suitable spring means to the bearing 4 such that pretensioning of the main folding axis 5 takes place in a predetermined direction of rotation. Preferably the spring pretensioning is provided so that an automatic folding motion of the visor body 1 around the main folding axis 5 is accomplished, starting at a predetermined angle in the direction of the vehicle roof, for storing the sun visor in the non-use position.

Figure 4:
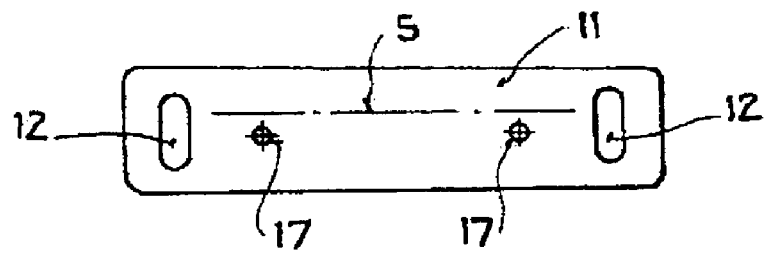
FIG. 4 shows a schematic of a visor means assigned to the single sun visor from FIG. 3 according to one preferred embodiment of this invention.

FIG. 4 illustrates a schematic view of a visor means 11 with two recesses 12 for ensuring the folding motion of each of the respective bent ends 13 of the axis of rotation 2 which are assigned or of the clip arm. The visor means 11 can be mounted for example by way of assigned screw holes 17 on the assigned roof area.

Figure 5:
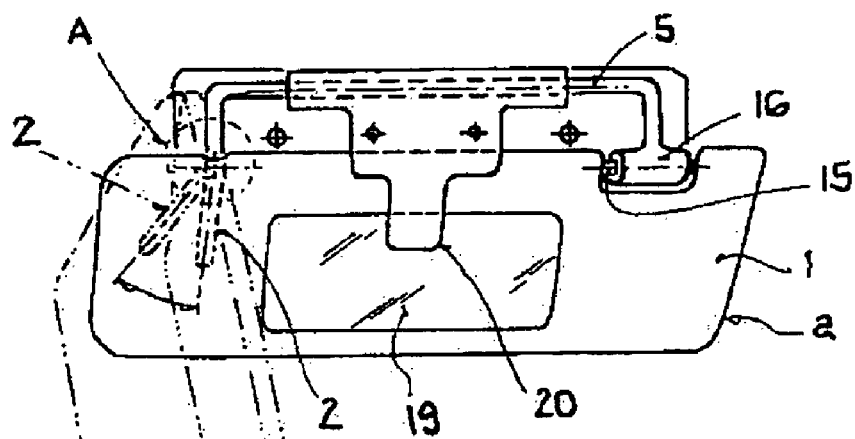
FIG. 5 shows a view of the sun visor in three difference positions of use according to one preferred embodiment of this invention, viewed towards the front of the vehicle.
Figure 6:
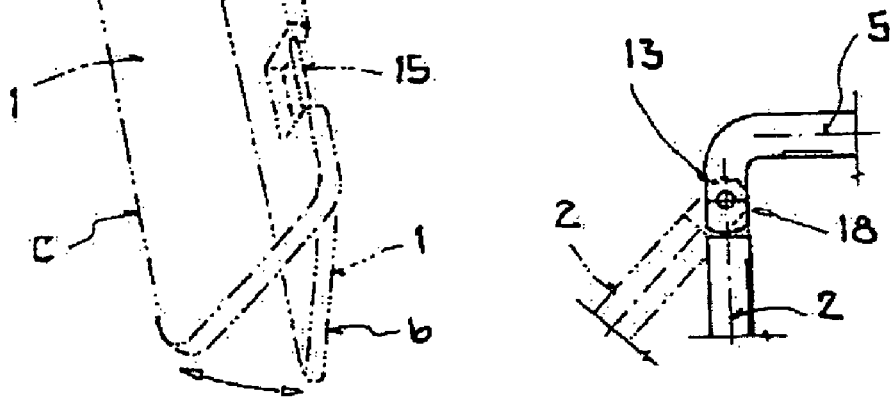
FIG. 6 shows an enlargement of the partial extract A from FIG. 5.

With reference to FIGS. 5 and 6, another embodiment of this invention is detailed below. Here FIG. 5 illustrates a schematic of a sun visor in a first use position a, in a second use position b and in a third use position c. FIG. 6 shows an enlargement of the extract A from FIG. 5.

As is to be seen in FIGS. 5 and 6, the axis of rotation 2 according to this embodiment has a hinge 18 such that a lower section of the axis of rotation 2 and thus of the main visor body 1 can be tilted relative to the bent end 13 with a predetermined angle for example in the direction of an assigned side window.

With reference to FIG. 5, use of the sun visor according to the invention is detailed below. Proceeding from the non-use position which is not shown and in which the main visor body 1 is stored resting on the vehicle roof, the main visor body 1 is folded around the main folding axis 5 into the first use position a. In this instance, on the surface of the main visor body 1 facing the vehicle occupant, for example, there can advantageously be a mirror 19 with an assigned cover and a map holding device 20.

By unclipping the catch rod 15 from the catch receiver 16, the main visor body 1 can be rotated from the first use position a around the axis of rotation 2 into the second use position b in the direction of the assigned side surfaces of the window, as is to be seen in FIG. 5.

The additional hinge 18 moreover enables the main visor body 1 to be tilted out of for example the second use position b into the tilted third use position c by a predetermined angle, for example in the direction of the side window, as is likewise illustrated in FIG. 5.

Figure 7:
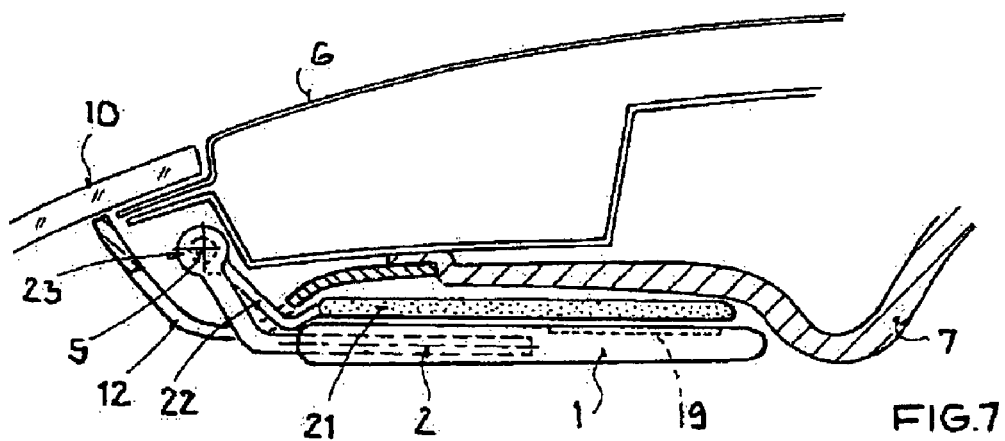
FIG. 7 shows a cross sectional view of a double sun visor according to the preferred embodiment of this invention.
Figure 8:
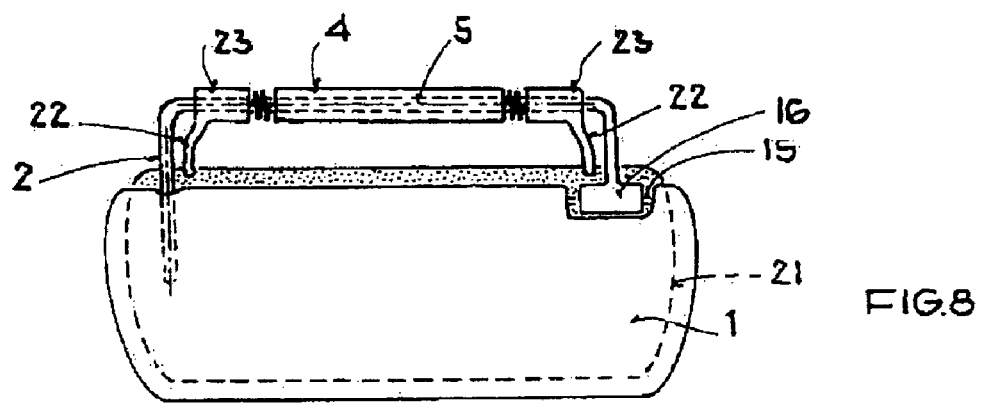
FIG. 8 shows a schematic of the double sun visor from FIG. 7 in the nonintegrated state.
Figure 9:
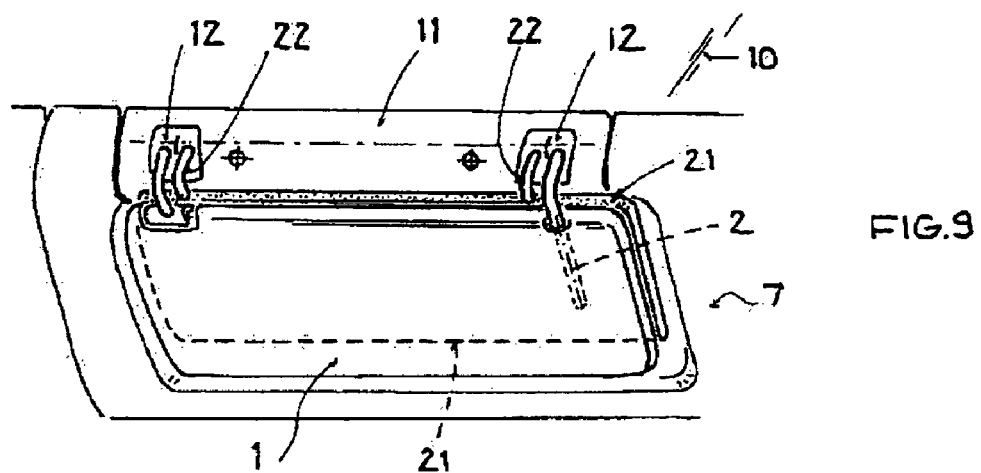
FIG. 9 shows a schematic view of the double sun visor from FIGS. 7 and 8, viewed in the direction of the rear of the vehicle in the integrated state.

With reference to FIGS. 7 to 9, another preferred embodiment of this invention is detailed below. FIG. 7 illustrates a cross sectional view of a double sun visor, FIG. 8 shows a schematic front view of the double sun visor in FIG. 7, viewed in the direction of the front side of the motor vehicle roof, and FIG. 9 shows a schematic of the double sun visor from FIGS. 7 and 8 viewed in the direction of the back of the vehicle.

As is to be seen in FIGS. 7 to 9, the double sun visor has a main visor body 1 with, for example, an integrated mirror 19 which is configured, supported and pivotable around the respectively assigned axes analogously to the main visor body of the aforementioned embodiments.

In contrast to the aforementioned embodiments, there is a second visor body in the form of an auxiliary visor body 21 which in the non-use position of the double sun visor is located preferably between the assigned roof segment and the main visor body 1, as is shown in particular in FIG. 7.

The auxiliary visor body 21 has for example symmetrically arranged clip arms 22 which are connected to the respectively assigned sections of the auxiliary visor body 21. The clip arms 22 are mounted by way of suitable bearings 23 to the main folding axis 5 to be able to pivot around the main folding axis 5. Thus the main visor body 1 and the auxiliary visor body 21 can be pivoted independently of one another around the common main folding axis 5, the main folding axis 5, as already explained above, being integrated in an assigned roof area of the vehicle completely outside of the two visor bodies 1 and 21 and spaced a distance from them.

Thus the main visor body 1 in the above described manner can be folded, rotated and/or tilted out of the non-use position into diverse positions of use, if in turn there is an additional hinge in the axis of rotation 2, and the auxiliary visor body 12 can be pivoted at the same time around the common main folding axis 5. Preferably the clip arms 22 are in turn pivotally coupled via spring means 24 to the main folding axis 5 and are pretensioned such that an automatic folding motion is executed in a predetermined direction, for example into the non-use position, starting from a predetermined angle.

It is obvious to one skilled in the art that the auxiliary visor body 21 as well can be coupled only on one side via the axis of rotation to the main folding axis, and the other side can be coupled analogously to the main visor body 1 via a catch connection. In this case, it would be possible for both the main visor body 1 and the auxiliary visor body 21 to be foldable around the main folding axis 5, to be pivotable around the respective axis of rotation and in the presence of the assigned hinge additionally to be tiltable.

As is shown in FIG. 9, the assigned visor means 11 of the double sun visor has suitable recesses 12 both for a free folding motion of the main visor body 1 and also for a free folding motion of the auxiliary visor body 21.

Thus, this invention forms a single sun visor and a double sun visor in which a common folding axis is provided outside of the respective visor body spaced a distance from it and is integrated into the roof frame in the area of the roof structure adjacent to the windshield. Thus, the folding axis does not constitute a danger for injury of occupants in the event of an accident, since it is integrated into the roof structure, not exposed, but concealed. For further occupant protection, the structure at a predetermined location or at several predetermined locations can have one or more predetermined breaking points which, in the event of impact of, for example, an occupant's head, break in a defined manner and release the respective visor body.

The visor body can be made thinner by the sun visor according to the invention, since the main folding axis need not be integrated in the respective visor body. Thus the required installation space can be advantageously reduced in addition.

By the external support of the main folding axis, the sun visor can be selectively provided or retrofitted with only one visor body or with two or more visor bodies. By providing a folding axis, an axis of rotation, and a tilt hinge according to the invention, the visor bodies can be folded, rotated and/or tilted into any positions of use. In this way, optimum shielding of any incident solar radiation is ensured, so that the driver of the motor vehicle is not blinded in any position of the sun and the danger of an accident is reduced.

Although this invention was described above using preferred embodiments, it is not limited thereto, but can be modified in many ways.

For example, the visor body can be connected to the main folding axis, instead of by way of two arms, only by way of one arm, this arm being integrated for example as the axis of rotation 2 in the middle in the visor body transversely to the longitudinal extension.

In addition, more than two visor bodies are conceivable which are equipped with the corresponding axes for a folding process, a rotation process and/or a tilting process.

The sun visor can also be equipped such that the visor body is used for example in the non-use position as the cover of assigned bearings, so that an additional covering can be omitted.

REFERENCE SYMBOL LIST 1 main visor body
2 axis of rotation
3 reinforcing area
4 main bearing
5 main folding axis
6 motor vehicle roof
7 headliner
8 structure element
9 roof body
10 windshield
11 visor means
12 recess
13 bent end
14 catch connection
15 catch rod
16 catch receiver
17 screw holes
18 hinge
19 mirror
20 map holding device
21 auxiliary visor body
22 clip arms
23 bearing
24 spring means
a first use position
b second use position
c third use position

The invention claimed is:

1. A sun visor for a motor vehicle, comprising:
a first support member attachable to an underside of a roof of said vehicle adjacent a window thereof;
a second support member mounted on said first support member pivotally adjustable relative to said first support member about a first axis of said first support member disposed transversely relative to said vehicle; and
a panel mounted on said second support member pivotal about a second axis of said second support member disposed at an angle relative to said first axis,
wherein said panel includes means for detachably securing said panel coextensively with said first axis upon pivotal movement of said panel about said second axis, said means comprising a recess in said panel which receives a portion of said first support member when said panel is pivoted about said second axis into position coextensive when said first axis.

2. A sun visor according to claim 1 wherein said axes are angularly displaced 90°.

3. A sun visor according to claim 1 wherein said second support member comprises a rectilinear rod section on which said panel is pivotally mounted, and a curved rod section pivotally connected to said first support member.

4. A sun visor according to claim 1 wherein said panel is receivable within a recess in the underside of said roof upon pivoting said second support member about said first axis.

5. A sun visor according to claim 1 including third support member mounted on said first support member, pivotal about said first axis, and a second panel supported on said third support member.

6. A sun visor according to claim 5 wherein said third support member includes a first section and a second section pivotally connected to said first section, and said second panel is mounted on said second section for pivotal movement about a third axis.

7. A sun visor according to claim 1 including means for biasing said second support member in a predetermined direction for pivotal movement.

* * * * *

UNITED STATES PATENT AND TRADEMARK OFFICE
CERTIFICATE OF CORRECTION

| | | |
|---|---|---|
| PATENT NO. | : 7,954,875 B2 | Page 1 of 1 |
| APPLICATION NO. | : 11/921160 | |
| DATED | : June 7, 2011 | |
| INVENTOR(S) | : Jan Boehner and Hans-Juergen Franz | |

It is certified that error appears in the above-identified patent and that said Letters Patent is hereby corrected as shown below:

Title Page, Item (75) inventors: The first named inventor is Jan Bohner. Please correct to read Jan Boehner.

Under claim 1 - The last line of claim 1 currently reads "...when said first axis." Please replace "when" with "with". The last line should read "...with said first axis."

Signed and Sealed this
Ninth Day of August, 2011

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,954,875 B2
APPLICATION NO. : 11/921160
DATED : June 7, 2011
INVENTOR(S) : Jan Boehner and Hans-Juergen Franz It is certified that error appears in the above-identified patent and that said Letters Patent is hereby corrected as shown below:

Title Page, Item (75) inventors: The first named inventor is Jan Bohner. Please correct to read Jan Boehner.

Column 8, line 31 (Claim 1, line 17) currently reads "...when said first axis." Please replace "when" with "with". The last line should read "...with said first axis."

This certificate supersedes the Certificate of Correction issued August 9, 2011.

Signed and Sealed this
Thirtieth Day of August, 2011

David J. Kappos
*Director of the United States Patent and Trademark Office*